(12) United States Patent
Jang et al.

(10) Patent No.: US 8,989,919 B2
(45) Date of Patent: Mar. 24, 2015

(54) SERVER, VEHICLE CONTROL SYSTEM, AND VEHICLE CONTROL METHOD THEREOF

(71) Applicant: Samsung Electronics Co., Ltd., Gyeonggi-do (KR)

(72) Inventors: Young-shil Jang, Gyeonggi-do (KR); Young-ho Rhee, Gyeonggi-do (KR); Il-ku Chang, Gyeonggi-do (KR); Young-kyu Jin, Seoul (KR)

(73) Assignee: Samsung Electronics Co., Ltd (KR)

( * ) Notice: Subject to any disclaimer, the term of this patent is extended or adjusted under 35 U.S.C. 154(b) by 27 days.

(21) Appl. No.: 13/735,600

(22) Filed: Jan. 7, 2013

(65) Prior Publication Data
US 2013/0190947 A1    Jul. 25, 2013

(30) Foreign Application Priority Data
Jan. 20, 2012 (KR) .......................... 10-2012-0006970

(51) Int. Cl.
*G06F 17/00* (2006.01)
*B60R 16/02* (2006.01)

(52) U.S. Cl.
CPC ................. *G06F 17/00* (2013.01); *B60R 16/02* (2013.01)
USPC ............... 701/2; 701/36; 340/5.64; 340/5.31; 340/5.61; 340/5.6; 340/5.32

(58) Field of Classification Search
CPC ....... G06F 17/00; B60R 16/02; B60R 16/037; H04B 1/00; G08B 29/00; G06K 19/00
USPC .............. 701/2, 36; 340/5.64, 5.31, 5.61, 5.6, 340/5.32
See application file for complete search history.

(56) References Cited

U.S. PATENT DOCUMENTS

| 2006/0038447 A1* | 2/2006 | Bruelle-Drews ............. 307/10.1 |
| 2007/0143482 A1 | 6/2007 | Zancho |
| 2008/0024296 A1* | 1/2008 | Jeong ........................ 340/539.26 |
| 2010/0222939 A1* | 9/2010 | Namburu et al. ................. 701/2 |
| 2011/0087385 A1 | 4/2011 | Bowden et al. |
| 2014/0005859 A1* | 1/2014 | Baskin et al. ..................... 701/2 |
| 2014/0046505 A1* | 2/2014 | Sakoda et al. .................... 701/2 |

FOREIGN PATENT DOCUMENTS

| DE | 10034380 A1 * | 10/2006 | ............ B60R 16/037 |
| EP | 1 884 415 | 2/2008 | |
| KR | 100828965 | 5/2008 | |
| WO | WO 2006111466 A3 * | 10/2007 | .............. B60R 16/02 |

OTHER PUBLICATIONS

IBM, Method and System for Automated Personal Preference Adjustments for Traveling User, Nov. 19, 2002, ip.com, ip.com No. IPCOM000010303D.*

* cited by examiner

*Primary Examiner* — Mary Cheung
*Assistant Examiner* — Brian P Sweeney
(74) *Attorney, Agent, or Firm* — The Farrell Law Firm, P.C.

(57) ABSTRACT

A vehicle control method of a server is provided. The vehicle control method includes receiving, when a user terminal is connected, user information from the user terminal, searching for vehicle environment information corresponding to the user information, and controlling an environment of a vehicle using the searched vehicle environment information.

15 Claims, 8 Drawing Sheets

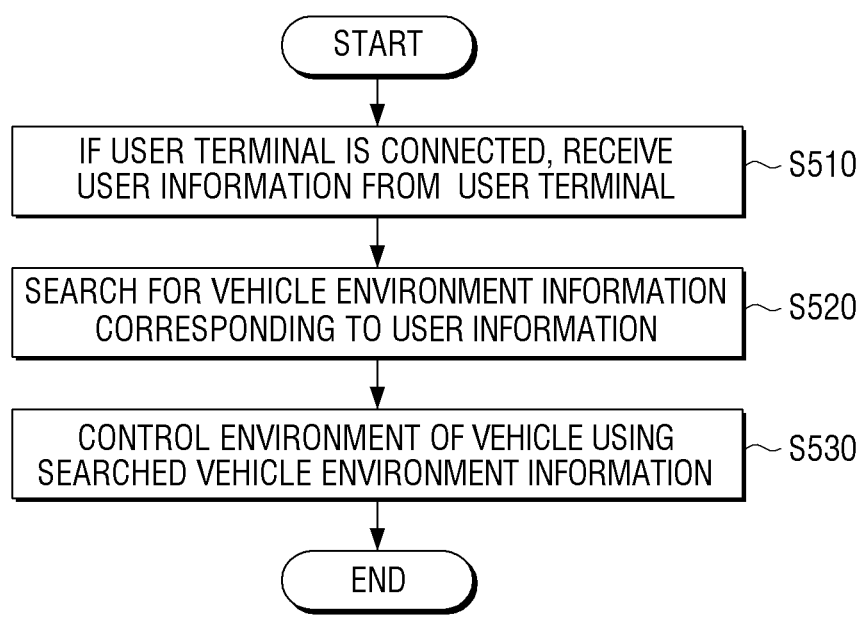

SERVER, VEHICLE CONTROL SYSTEM, AND VEHICLE CONTROL METHOD THEREOF

PRIORITY

This application claims priority under 35 U.S.C. §119 to Korean Patent Application No. 10-2012-0006970, filed on Jan. 20, 2012 in the Korean Intellectual Property Office, the contents of which are incorporated herein by reference.

BACKGROUND OF THE INVENTION

1. Field of the Invention

The present invention relates generally to a server which can be interlocked with a user terminal, a vehicle control system, and a vehicle control method thereof.

2. Description of the Related Art

Telematics is a complex service that incorporates communication, information, and motor technologies, and refers to a technology that diagnoses and controls a vehicle through a wired/wireless communication network such as a mobile communication network or a broadcast network, and provides a multimedia service and a navigation service.

From among various telematics services, a service that diagnoses and controls a vehicle and controls various multimedia apparatuses such as a car stereo, a Digital Versatile Disk (DVD) player, and an amplifier, is a technology relating to a telematics terminal that accesses a vehicle network such as a Control Area Network (CAN), a Local Interconnect Network (LIN), and a Media Oriented System Transport (MOST®), and is being actively developed.

It is common that vehicles are not owned as much as a number of family members and one vehicle is shared by many family members. Therefore, there is a problem that a user should change an environment of a vehicle every time that the user rides in the vehicle.

SUMMARY OF THE INVENTION

The present invention overcomes the above disadvantages and other disadvantages not described above.

Accordingly, embodiments of the present invention provide a server that controls an environment of a vehicle to correspond to user information provided from a user terminal, a vehicle control system, and a vehicle control method thereof. According to an aspect of the present invention, there is provided a vehicle control method of a server, including receiving, if a user terminal is connected, user information from the user terminal, searching for vehicle environment information corresponding to the user information, and controlling an environment of a vehicle using the searched vehicle environment information.

According to an aspect of the present invention, there is provided a vehicle control method of a vehicle control system which includes a server and a user terminal, the vehicle control method including accessing, by the user terminal, the server according to an event and transmitting user information to the server, receiving, by the server, the user information from the user terminal and searching for vehicle environment information corresponding to the user information, and controlling, by the server, an environment of a vehicle using the searched vehicle environment information.

According to an aspect of the present invention, there is provided a server including a communication unit which receives, when a user terminal is connected to the server, user information from the user terminal, a search unit which searches for vehicle environment information corresponding to the user information, and a controller which generates a control signal to change an environment of a vehicle using the searched vehicle environment information and controls the vehicle.

According to an aspect of the present invention, there is provided a vehicle control system, including a user terminal which accesses a server according to an event and transmits user information to the server, and a server which searches for, when user information is received from the user terminal, vehicle environment information corresponding to the user information and controls an environment of a vehicle using the searched vehicle environment information.

BRIEF DESCRIPTION OF THE DRAWINGS

The above and/or other aspects will be more apparent by describing in detail embodiments of the present invention with reference to the accompanying drawings, in which:

FIG. 5 illustrates a vehicle control method of a server according to an embodiment of the present invention.

DETAILED DESCRIPTION OF EMBODIMENTS OF THE INVENTION

Figure 1:
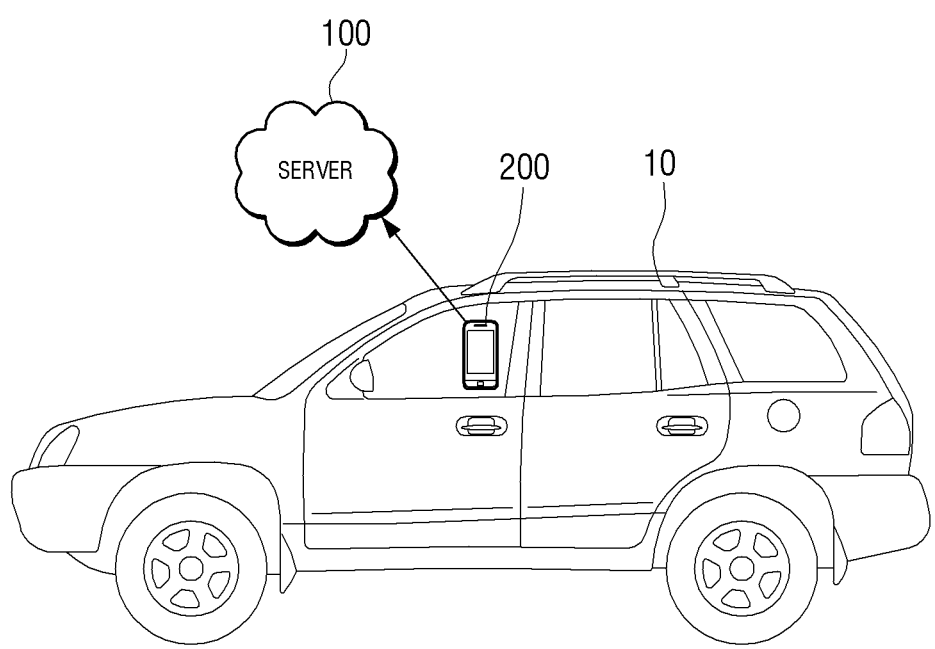
FIG. 1 illustrates a vehicle control system according to an embodiment of the present invention.

Hereinafter, embodiments of the present invention will be described in detail with reference to the accompanying drawings.

In the following description, same reference numerals are used for the same elements when they are depicted in different drawings. The matters defined in the description, such as detailed construction and elements, are provided to assist in a comprehensive understanding of embodiments of the present invention. Thus, it is apparent that embodiments of the present invention can be performed without those specifically defined matters. Also, functions or elements known in the related art are not described in detail for the sake of clarity and conciseness.

FIG. 1 illustrates a vehicle control system according to an embodiment of the present invention.

Referring to FIG. 1, a vehicle control system 1000 includes a server 100 and a user terminal 200 that is located in a vehicle 10.

The server 100 collects a variety of information and contents collected through the user terminal 200 located in the vehicle 10 and controls the vehicle 10. However, the user terminal 200 is not necessarily located in the vehicle 10 and may be located within a distance range from the vehicle 10.

For example, the server 100 may be realized by a server which provides a telematics function.

The telematices recited herein is a compound word which is formed from the words "telecommunication" and "informatics", and refers to an integrated service that grafts a Location-Based System (LBS), which uses a mobile communication network, a Global Positioning System (GPS), or a Geographic Information System (GIS), and an Intelligent Transport System (ITS) onto a vehicle and thus provides a driver with a navigation service, information on a vehicle accident, car theft, and traffic, or other life convenience information on a real time basis.

Specifically, if the user terminal 200, which is located within a predetermined range from the vehicle 10, is connected to the server 100, the server 100 receives user information from the user terminal 200, searches for vehicle environment information corresponding to the received user information, generates a control signal to change an environment of the vehicle 10 using the searched vehicle environment information, and controls the vehicle 10.

The user terminal 200 transmits the user information to the server 100 when the user terminal 200 is connected to the server 100. The user information recited herein may be a body size of a user, user identification information, and identification information of the user terminal 200, which are input through the user terminal 200. The user terminal 200 may be realized by a mobile phone, a notebook computer, a Portable Multimedia Player (PMP), or an MP3 player.

The server 100 and the user terminal 200 may be connected to each other in various ways. For example, if the user terminal 200 is located within a distance range from the vehicle 10, the server 100 and the user terminal 200 may be automatically connected to each other. That is, if the user terminal 200 is located within the distance range from the vehicle 10, the user terminal 200 may be connected to the server 100 by accessing the server 100. However, this should not be considered as limiting. The server 100 may sense a location of the user terminal 200 and try to be connected to the user terminal 200.

The user terminal 200 may be connected to the server 100 if a relevant application in the user terminal 200 is executed or if a relevant communication module is activated. That is, if the relevant application is executed or if the relevant communication module is activated, the user terminal 200 may automatically access the server 100.

The server 100 and an element to be controlled in the vehicle 10 may be connected to each other through a vehicle network such as a CAN, a LIN, and a MOST®.

Figure 2A:
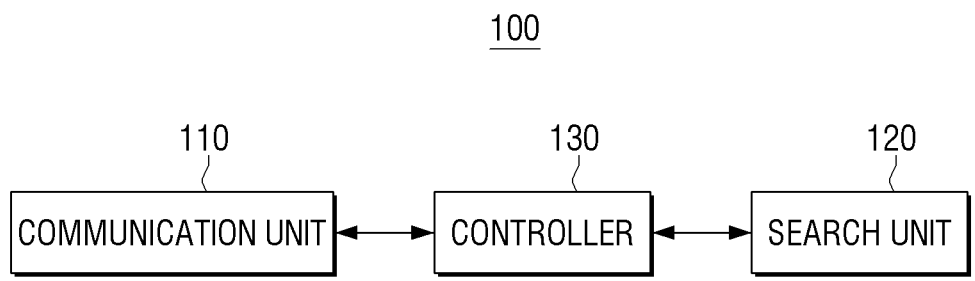
FIG. 2A illustrates a server according to an embodiment of the present invention.

FIG. 2A illustrates a server according to an embodiment of the present invention.

Referring to FIG. 2A, a server 100 includes a communication unit 110, a search unit 120, and a controller 130.

The server 100 collects a variety of information and contents collected through a user terminal 200 located within a distance range from a vehicle 10 (see FIG. 1), and controls the vehicle 10.

For example, the server 100 may be realized by a telematics service provider (TSP) server that provides a telematics system. In this case, the telematics service provider server may provide a navigation service, a safety and security service, an infotainment service, and a mobile office service.

The server 100 may provide an LBS, which is a service that exactly recognizes a location of a person or an object y based on a location of a user terminal, and provides an additional information service associated with the location.

If the user terminal 200 (see FIG. 1) is connected to the communication unit 110, the communication unit 110 may receive user information from the user terminal 200. The communication unit 110 and the user terminal 200 may be connected to each other by executing a relevant application in the user terminal 200 or activating a relevant communication module. For example, if the user terminal 200 is located within a predetermined range from the vehicle 10, the communication unit 110 may be connected to the user terminal 200 automatically or may be connected to the user terminal 200 by being accessed by the user terminal 200 and activating a relevant communication module.

However, this is merely an example, and, if the user terminal 200 is not located within the distance range from the vehicle 10 (see FIG. 1), but if an event is generated from the user terminal 200, the communication unit 100 may be connected to the user terminal 200.

The search unit 120 may search for vehicle environment information corresponding to the user information. The user information recited herein may be a body size of the user or identification information of the user terminal, which is input through the user terminal 200. However, this is merely an example and the user information may be identification information of the user, such as a user name or a role in a family, such as a Mother or Father. In this case, the server 100 or an external data server (not shown) may store vehicle environment information or a body size corresponding to identification information of each user.

The vehicle environment information may be guide information on at least one of a vehicle internal apparatus such as a rearview mirror, a seat, a navigation system, an air conditioner, a heater, an interior light, a brake, a transmission, and a window, which are provided in a vehicle, and various multimedia apparatuses such as a car stereo, a DVD player, an amplifier, and a CDP.

For example, if the user information is a body size of the user input through the user terminal 100, the search unit 120 may search for vehicle environment information corresponding to the body size of the user. For example, if the user is 184 cm tall and weighs 86 kg, the search unit 120 may search for rearview mirror guide information or seat guide information corresponding to the corresponding body size.

If the user information is identification information of the user terminal or user identification information, the search unit 120 may search for vehicle environment information corresponding to the information.

For example, the search unit 120 may search for guide information on at least one of a vehicle internal apparatus such as a rearview mirror, a seat, a navigation system, an air conditioner, a heater, an interior light, a brake, a transmission, and a window, and various multimedia apparatuses such as a car stereo, a DVD player, an amplifier, and a CDP, according to the identification information of the user terminal. For the air conditioner or the heater, a temperature can be controlled according to current weather.

However, an element in the vehicle 10 that is automatically controlled in accordance with the user information may be pre-set by the user. For example, only the rearview mirror and the seat may be set to be automatically controlled in accordance with the user information, or an element to be controlled may be set differently according to a user. This may be achieved through a UI screen of the user terminal 200.

The search unit 120 may search for the vehicle environment information from an external data server (not shown). That is, the external data server (not shown) may pre-store the vehicle environment information corresponding to the body size of the user and the identification information of each user terminal, and the server 100 may access the external data server (not shown) to search for the vehicle environment information.

Also, the server 100 and each element to be controlled in the vehicle 10 may be connected to each other through a vehicle network such as a CAN, a LIN, and a MOST®.

Figure 2B:
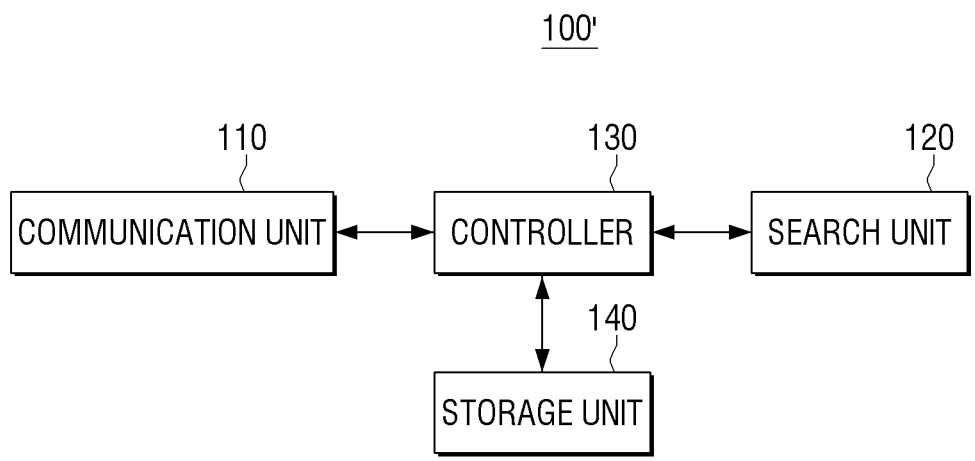
FIG. 2B illustrates a server according to another embodiment of the present invention.

FIG. 2B illustrates a server according to another embodiment of the present invention.

Referring to FIG. 2B, a server 100' includes a communication unit 110, a search unit 120, a controller 130, and a storage unit 140. The same elements as those of FIG. 2A will not be explained in detail.

The storage unit 140 may store vehicle environment information corresponding to user information, that is, at least one of a body size of the user, identification information of the user terminal, and user identification information.

In this case, the server 100' does not use an external data server (not shown) and may search for the vehicle environment information corresponding to the user information from the storage unit 140.

Figure 3:
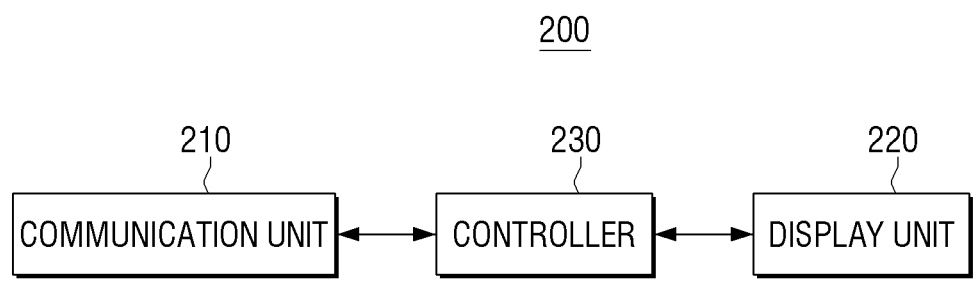
FIG. 3 illustrates a user terminal according to an embodiment of the present invention.

FIG. 3 illustrates a user terminal according to an embodiment of the present invention.

Referring to FIG. 3, a user terminal 200 includes a communication unit 210, a display unit 220, and a controller 230.

The communication unit 210 communicates with the server 100 or 100'. The server 100 or 100' collects a variety of information and contents collected through the user terminal 200 located in a vehicle 10, and control the vehicle 10. For example, the server 100 may be realized by a server which provides a telematics function.

The communication unit 210 may be realized by a Bluetooth® communication module, a Wi-Fi communication module, or a Universal Serial Bus (USB) communication module. Accordingly, the communication unit 210 may communicate with the server 100 or 100' using a USB standard, Bluetooth®, Wi-Fi, or other well-known wired or wireless protocols.

The display unit 220 may display various UI screens to provide a telematics function.

For example, the display unit 220 may display a UI screen to receive input of user information. The user information may be a body size of the user or user identification information.

The display unit 220 may display a UI screen to provide a menu to execute the telematics function. The menu to execute the telematics function may be an application to execute the telematics function.

The controller 230 controls an overall operation of the user terminal 200.

Specifically, if the user terminal 200 is located in the vehicle 10 or located within a distance range from the vehicle 10, the controller 230 activates a relevant communication module automatically and controls the communication unit 210 to access the server 100.

For example, if the communication unit 210 is realized by a Bluetooth® communication module, the communication unit 210 performs pairing with the server 100 or 100' in order to communicate with the server 100 or 100' according to the Bluetooth® communication method. If the pairing is completed, an apparatus Identification (ID) (or an address) of the user terminal 200 may be registered at the server 100 or 100'

If a relevant application is executed on the UI screen provided by the display unit 220 or if a relevant communication module is activated according to a user command, the controller 230 may control the communication unit 210 to access the server 100.

Figure 4A:
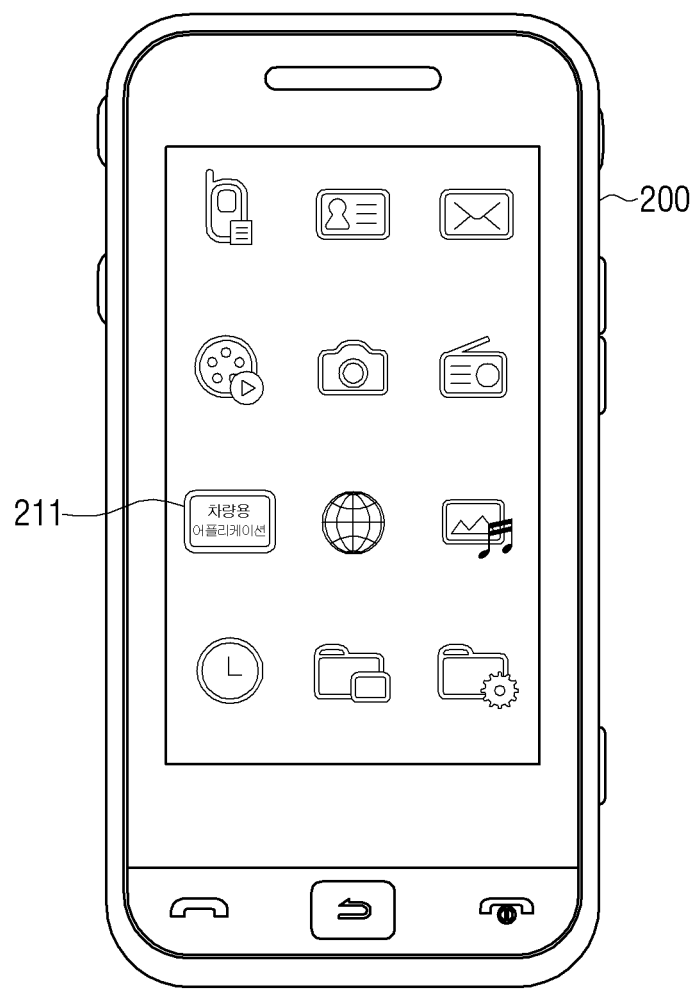
FIGS. 4A to 4C illustrate UI screens of a user terminal according to embodiments of the present invention.
Figure 4B:
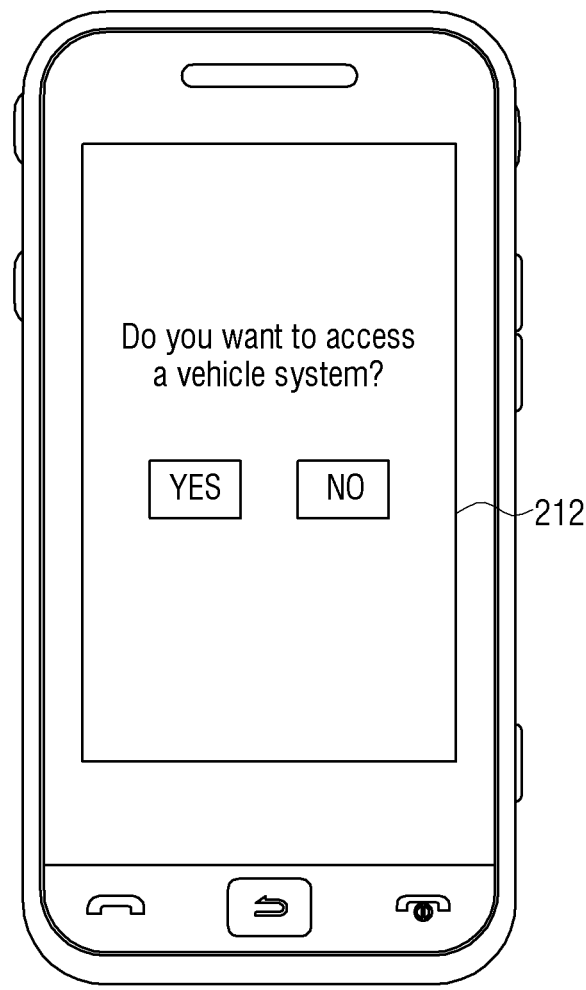
Figure 4C:
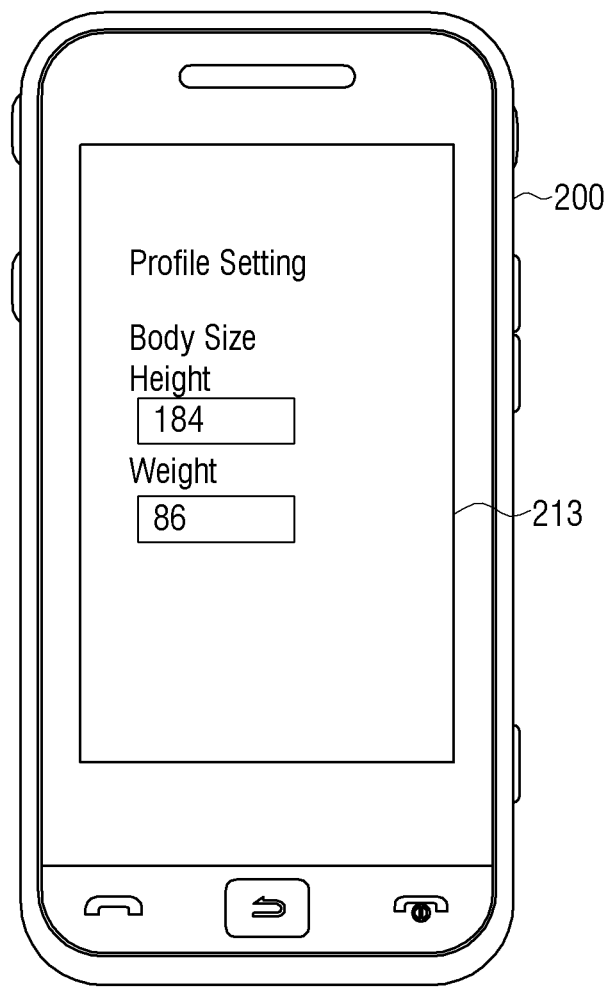

FIGS. 4A to 4C illustrate UI screens of the user terminal according to embodiments of the present invention.

As shown in FIG. 4A, the user terminal 200 may provide a UI screen including an application 211 for a vehicle to provide a function. For example, the application 211 may be realized by an application which provides a telematics function. In this case, if the user executes the application 211, the user terminal 200 may access the server 100 or 100' and transmit user information to the server 100 or 100'.

If the user terminal 200 is located in the vehicle 10 or located within a distance range from the vehicle 10, a UI screen 212 inquiring as to whether to access the server 100 in order to access a vehicle system may be displayed as shown in FIG. 4B. However, this is merely an example, and, if the user terminal 200 is located in the vehicle 10 or located within the distance range from the vehicle 10, the user terminal 200 may be automatically connected to the server 100 or 100'.

As shown in FIG. 4C, the user terminal 200 may display a UI screen 213 to input user information. For example, a UI screen to input a body size of the user may be displayed as shown in FIG. 4C.

If a plurality of pieces of user information input through the UI screen shown in FIG. 4C are stored, a UI to select user information or a UI screen to input a variety of user information such as navigation setting or radio channel setting may be displayed, although not shown.

Also, a UI screen to set an element to be automatically controlled according to user information may be displayed. Accordingly, an element to be controlled may be differently set according to a user. For example, a parent may set a rearview mirror and a seat as an element to be controlled, another parent may set a vehicle temperature and a seat as an element to be controlled, and the other elements may be set as default. Of course, vehicle environment information that can be searched may be set to be automatically controlled without limitation.

FIG. 5 illustrates a vehicle control method of a server according to an embodiment of the present invention.

Referring to FIG. 5, if a user terminal is connected to a server, the server receives user information from the user terminal in step S510.

The server searches for vehicle environment information corresponding to the user information in step S520.

After that, the server controls environment of a vehicle using the searched vehicle environment information in step S530.

The user information may be a body size of a user which is input through the user terminal.

The user information may be at least one of identification information of the user terminal and user identification information.

The vehicle environment information may be guide information on at least one of a rearview mirror, a seat, a navigation system, a radio provided in the vehicle, and a temperature of the vehicle.

In step S520 of searching for the vehicle environment information, the server may search for the vehicle environment information corresponding to the received user information from an external data server.

The server may be connected to the user terminal through at least one of Bluetooth®, Wi-Fi, and an USB if a predetermined event occurs.

Figure 6:
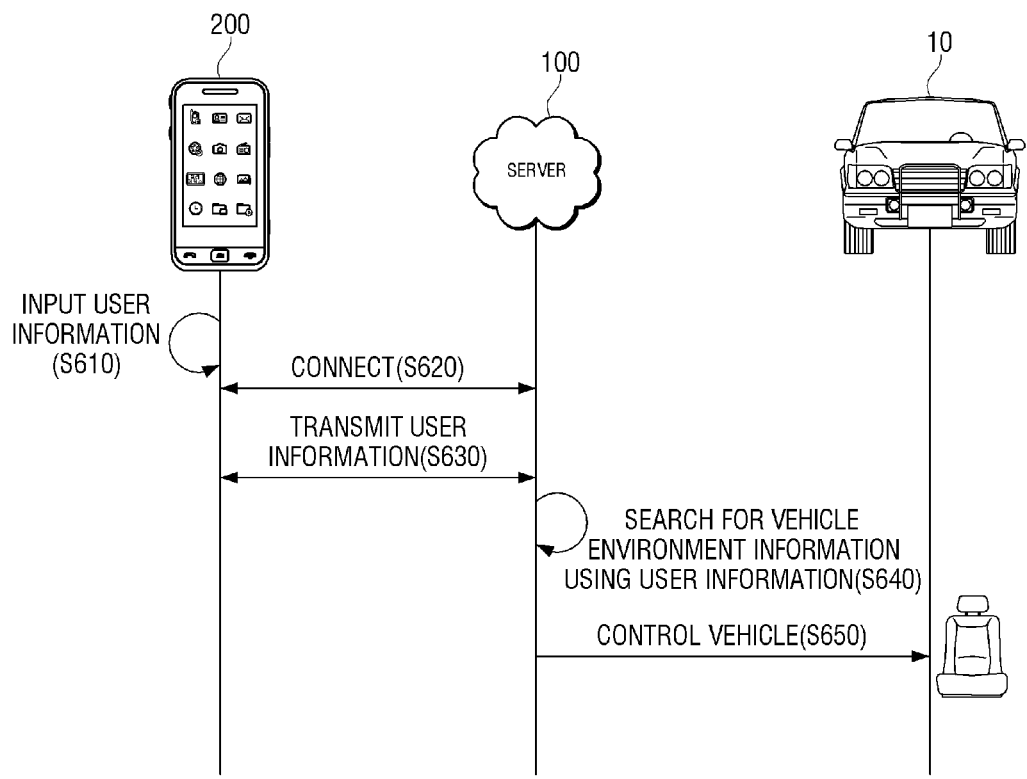
FIG. 6 illustrates an operation of a vehicle control system according to an embodiment of the present invention.

FIG. 6 is a sequence diagram to explain an operation of a vehicle control system according to an embodiment of the present invention.

Referring to FIG. 6, user information may input to the user terminal 200 in step S610. The user information may be a body size of a user and may be input through a UI screen which is provided by the user terminal 200 according to a user command.

However, this is merely an example and the user information may be user identification information, for example, a user name or a role in a family (mother or father). In this case, the server 100 or 100' or an external data server (not shown) may store vehicle environment information corresponding to identification information of each user. Also, a user body size corresponding to the identification information of each user may be stored.

According to a predetermined event, the user terminal 200 may access the server 100 or 100' and thus may be connected to the server 100 or 100' in step S620. The predetermined event may occur in at least one of when a user command is input through a UI screen provided through the user terminal 200 and when the user terminal 200 is located within a distance range from the vehicle 10.

If the server 100 or 100' and the user terminal 200 are connected to each other, the user terminal 200 transmits the user information to the server 100 or 100' in step S630.

The server 100 or 100' may search for vehicle environment information using the user information received from the user terminal 200 in step S640. In this case, the server 100 or 100' may search for vehicle environment information stored in a storage unit (not shown) included therein or an external data server (not shown) in step S640.

The server 100 or 100' may control an environment of the vehicle 10 using the searched vehicle environment information (in step S650. The vehicle environment information may be guide information on at least one of a rearview mirror, a seat, a navigation system, a radio provided in the vehicle, and a vehicle temperature of the vehicle.

However, this is merely an example, and, if identification information of the user terminal 200 and corresponding user information are pre-stored in the server 100 or 100', only the identification information of the user terminal 200 may be transmitted without inputting the user information.

A program to perform the method according to the above-described embodiments may be stored and used in a variety of recording media.

Specifically, a code to perform the above-described methods may be stored in various types of recording media readable by a terminal apparatus, such as a Random Access Memory (RAM), a flash memory, a Read Only Memory (ROM), an Erasable Programmable ROM (EPROM), an Electronically erasable and Programmable ROM (EEPROM), a register, a hard disk, a removable disk, a memory card, a USB memory, and a CD-ROM.

The foregoing embodiments and advantages are not to be construed as limiting the present inventive concept. The embodiments can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A vehicle control method of a server, the vehicle control method comprising:
    analyzing, by the server, a distance between a user terminal and the vehicle based on information on a location of the user terminal and the vehicle;
    receiving, at the server, when the analyzed distance is within a predetermined distance range, user information from the user terminal, the user information being one of body size of a user, user identification information and identification information of the user terminal;
    searching, by the server, for vehicle component information corresponding to the user information, the vehicle component information comprising guide information on a seat that is provided in the vehicle; and
    controlling, by the server, at least one component of a vehicle using the searched vehicle component information.

2. The vehicle control method as claimed in claim 1, wherein the user information is a body size of a user, which is input through the user terminal.

3. The vehicle control method as claimed in claim 1, wherein the vehicle component information further comprises guide information on at least one of a rearview mirror a navigation system, a multimedia apparatus that is provided in the vehicle, and a temperature of the vehicle.

4. The vehicle control method as claimed in claim 1, wherein searching for the vehicle component information comprises searching for vehicle component information corresponding to the user information from an external data server.

5. A vehicle control method of a vehicle control system which comprises a server and a user terminal, the vehicle control method comprising:
    analyzing, by the server, a distance between the user terminal and the vehicle based on information on a location of the user terminal and the vehicle;
    transmitting, by the user terminal, user information to the server when the analyzed distance is within a predetermined distance range, the user information being one of body size of a user, user identification information and identification information of the user terminal;
    receiving, by the server, the user information from the user terminal and searching for vehicle component information corresponding to the user information, the vehicle component information comprising guide information on a seat that is provided in the vehicle; and
    controlling, by the server, at least one component of a vehicle using the searched vehicle component information.

6. The vehicle control method as claimed in claim 5, wherein the user information is input through a User Interface (UI) screen, which is provided by the user terminal according to a user command.

7. The vehicle control method as claimed in claim 5, wherein transmitting the user information occurs when the analyzed distance is within a predetermined distance range and a user command is input through a UI screen provided through the user terminal.

8. A server, comprising:
    a communication unit which receives, when analyzed distance between a user terminal and the vehicle based on information on a location of the user terminal and the vehicle is within a predetermined distance range, user information from the user terminal, the user information being one of body size of a user, user identification information and identification information of the user terminal;
    a search unit which searches for vehicle component information corresponding to the user information, the vehicle component information comprising guide information on a seat that is provided in the vehicle; and
    a controller which generates a control signal to change at least one component of a vehicle using the searched vehicle component information and controls the vehicle.

9. The server as claimed in claim 8, wherein the user information is a body size of a user, which is input through the user terminal.

10. The server as claimed in claim 8, wherein the vehicle component information further comprises guide information on at least one of a rearview mirror, a navigation system, a multimedia apparatus that is provided in the vehicle, and a temperature of the vehicle.

11. The server as claimed in claim 8, wherein the search unit searches for vehicle component information corresponding to the user information from an external data server.

12. A vehicle control system, comprising:
- a server which analyzes a distance between a user terminal and the vehicle based on information on a location of the user terminal and the vehicle; and
- a user terminal which transmits user information to the server when the user terminal is located within a predetermined distance range from the vehicle, the user information being one of body size of a user, user identification information and identification information of the user terminal,
- wherein the server searches for, when user information is received from the user terminal, vehicle component information corresponding to the user information and controls at least one component of a vehicle using the searched vehicle component information, the vehicle component information comprising guide information on a seat that is provided in the vehicle.

13. The vehicle control system as claimed in claim 12, wherein the user information is input through a User Interface (UI) screen, which is provided by the user terminal according to a user command.

14. The vehicle control system as claimed in claim 12, wherein transmitting the user information occurs when the analyzed distance is within a predetermined distance range and a user command is input through a UI screen provided by the user terminal.

15. The vehicle control system as claimed in claim 12, wherein the user information is at least one of a body size of a user and identification information of the user terminal, which are input through the user terminal.

* * * * *